Dec. 9, 1969 U. J. SCHMIDT 3,482,899
LIGHT BEAM DEFLECTOR
Filed Sept. 10, 1965 2 Sheets-Sheet 1
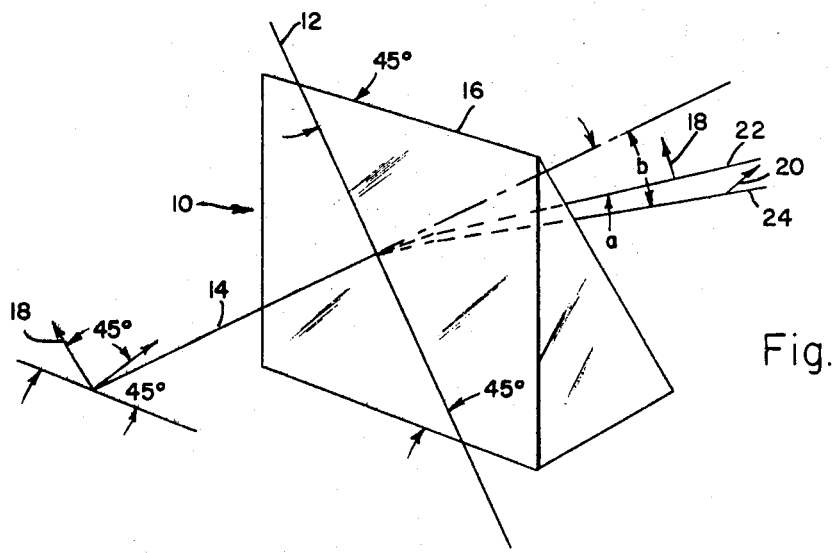
Fig. 1.
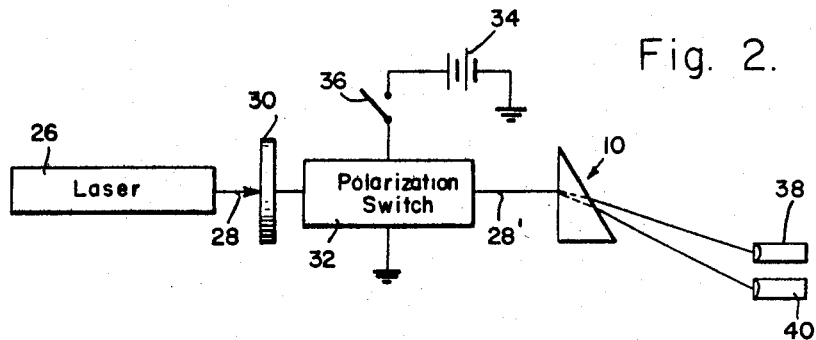
Fig. 2.
Fig. 5.
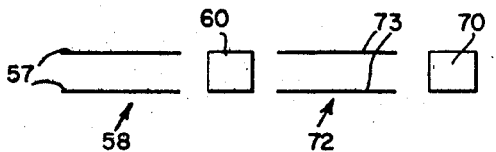
Uwe J. Schmidt,
INVENTOR
BY.
Jerry A. Dinardo
AGENT.

Dec. 9, 1969     U. J. SCHMIDT     3,482,899
LIGHT BEAM DEFLECTOR
Filed Sept. 10, 1965     2 Sheets-Sheet 2
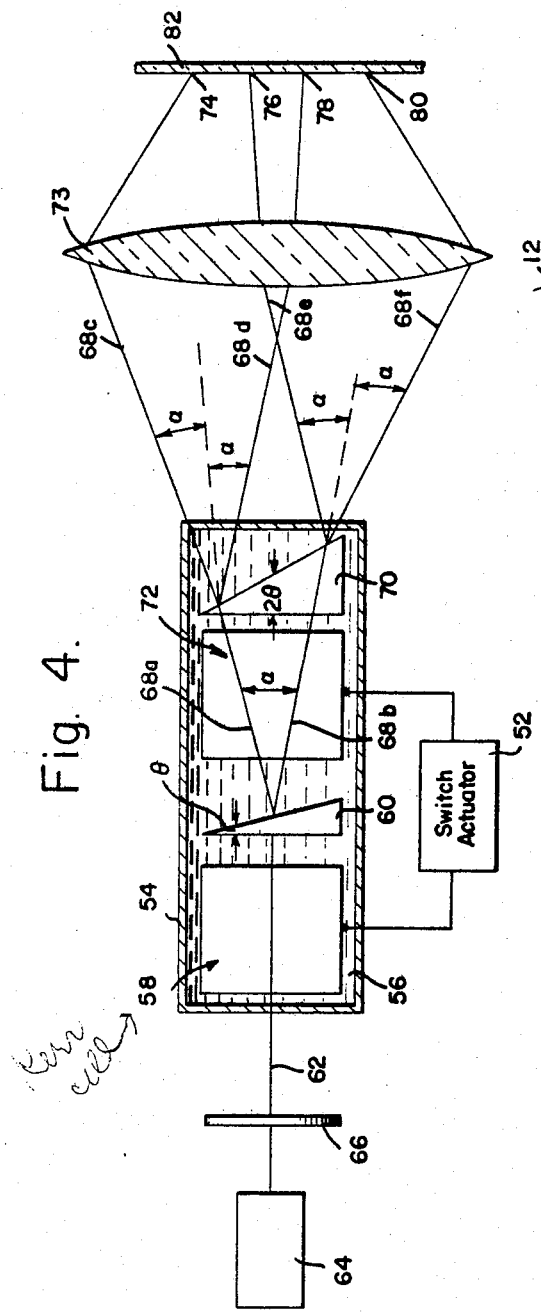
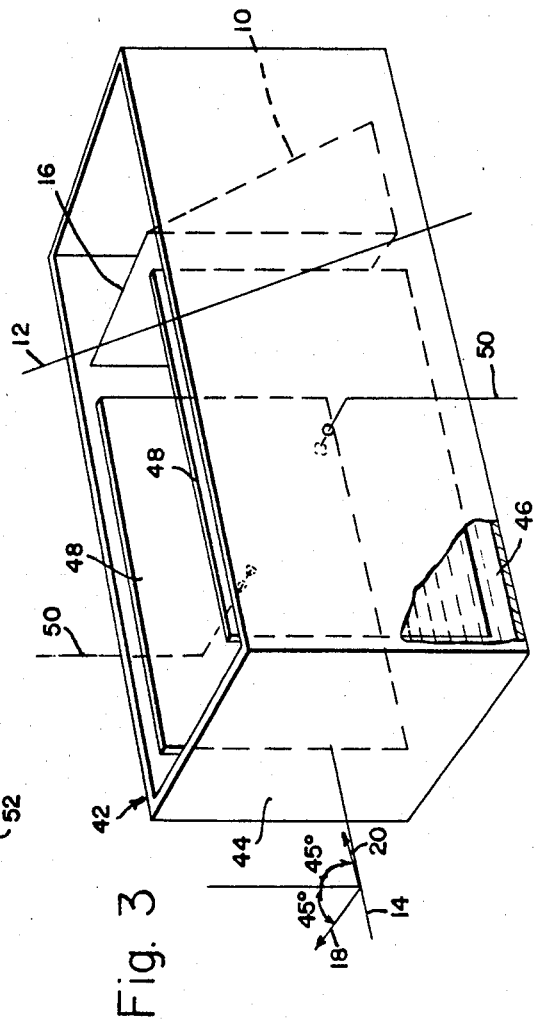
Uwe J. Schmidt,
INVENTOR.
BY.
Jerry A. Dinardo
AGENT.

United States Patent Office 3,482,899
Patented Dec. 9, 1969

3,482,899
LIGHT BEAM DEFLECTOR
Uwe J. Schmidt, Hamburg, Germany, assignor to TRW Inc., Redondo Beach, Calif., a corporation of Ohio
Filed Sept. 10, 1965, Ser. No. 486,364
Int. Cl. G02f 1/26, 1/28, 1/24
U.S. Cl. 350—150      9 Claims

ABSTRACT OF THE DISCLOSURE

This invention relates to digital light beam deflectors, and particularly to improvemnts designed to reduce the power supply requirements of such deflectors which are electronically actuated.

In a light beam deflector of the type consisting of an optical series array of alternate Kerr cells and birefringent prisms aligned along a longitudinal axis, each prism has its optic axis perpendicular to the longitudinal axis and inclined 45° to the prism apex. The electrode plates of the Kerr cells are perpendicular to the prism apexes. A light beam polarized in a plane at 45° to the apex of the first prism is caused to pass through the array. When the light beam polarization is switched back and forth through 90° by the Kerr cells, the beam passing through the Kerr cells and prisms is deflected in a plane parallel to the electrode plates of the Kerr cells.

---

It is known that in some anisotropic materials there are relatively great differences in the refractive index for different directions of propagation and polarization of light transmitted therethrough. This phenomenon is utilized to produce a light beam deflector by passing a plane polarized light beam through a birefringent material, which has double refractive properties, and by changing the angle of the plane of polarization of the beam to take advantage of the two refractive indices of the birefringent material to thereby accomplish the desired light beam switching.

In one form of light beam deflector, a prism is made from a uniaxial birefringent crystal, with its optic axis parallel or perpendicular to the apex. Such a prism has a single optic axis along which the refractive index is the same for all planes of polarization of incident light, and double refraction is not present. However, when a light beam is projected through the prism in a direction normal to the optic axis and the light is polarized in a plane parallel to the optic axis, the light beam will be deflected through a certain angle, whereas it will be deflected through a different angle for the direction of polarization perpendicular to the optic axis. This state of polarization of the light beam is switched electronically from the parallel to the perpendicular plane and vice versa by a polarization switch, or electro-optical retarder such as a Kerr cell, or a KTN (potassium tantolate niobate) crystal, to thereby deflect a light beam from one position to another. A group of such prisms and polarization switches arranged in alternate array along the axis of the incoming light beam will effect beam deflection through a number of different angles in one dimension. Another group of prisms and polarization switches added to the first group, with the prisms rotated 90° about the system axis, will effect beam deflection in two dimensions.

It has been found necessary to orient the light beam so that its polarization planes are at 45° angles respectively with the plates of the electro-optical retarder. This orientation is necessary in order to achieve complete switching between the two polarization planes. However, with the prism oriented so that its optic axis is parallel to one plane of polarization and perpendicular to the other, the beam deflections traverse planes that are at 45° angles with the Kerr cell plates. In order to accommodate successive beam deflections, the gaps between the plates of each consecutive Kerr cell have to be widened considerably, thereby requiring voltages of consecutively increasing order to effect polarization changes.

Accordingly, an object of this invention is to reduce the power supply requirements of a digital light beam deflector of the kind discussed.

Another object of this invention is to provide a light beam deflector in which the spacing between the plates of consecutive electro-optical retarders is substantially uniform.

In accordance with this invention, the optic axis of a prism in a light beam deflector is orientated so that it subtends an angle of 45 degrees with the apex instead of running parallel or perpendicular to the apex. Accordingly, at least for a one dimensional scan, the beam deflections traverse a plane that is parallel to the plates of the electro-optical retarder, thereby permitting very close spacing of the plates without interfering with the beam and permitting lower voltages to be used.

In the drawing:

FIG. 1 diagrammatically illustrates the operation of a birefringent prism constructed according to the invention;

FIG. 2 diagrammatically illustrates a basic form of apparatus embodying the invention;

FIG. 3 diagrammatically illustrates the construction of a deflector unit constructed in accordance with the invention;

FIG. 4 diagrammatically illustrates a beam deflector apparatus in accordance with the invention; and FIG. 5 is a plan view of a portion of the apparatus of FIG. 4.

In FIG. 1 there is shown a prism 10 made of uniaxial birefringent material with its optic axis 12 normal to a path 14 of a light beam. Examples of such materials are calcite and quartz. Such a material has a single optic axis (a direction, not a line) along which the refractive index is the same for all planes of polarization of incident light and no double refraction is present. This axis 12 is at a 45° angle to an apex 16 of the prism.

If a light beam is projected along the path 14 and passes through the prism 10 in a direction substantially normal to the optic axis 12, it is found that the emerging light is polarized into a plane polarized beam parallel to the optic axis 12 and a plane polarized beam perpendicular to the optic axis 12. The two beams are refracted by the prism by different amounts, the parallel plane polarized beam being deflected downwardly through an angle $a$ and the perpendicular plane polarized beam being deflected by an angle $b$. While the angle $b$ is shown as being larger than the angle $a$, the condition may be reversed, depending upon the type of material used for the prism.

Thus, it follows that if monochromatic light is plane polarized either parallel or perpendicular to the optic axis 12 before it enters the prism 10, it will be deflected by the prism by one of two different amounts, depending upon the angle of its plane of polarization. For example, if the light is polarized in a plane parallel to the optic axis, as represented by the arrow 18, it may follow a path 22 upon emerging from the prism, whereas, if it is polarized perpendicular to the optic axis, as represented by the arrow 20, it may emerge from the prism along a path 24.

As the plane of polarization of a light beam is switched from perpendicular to parallel, the beam will change its direction from that indicated by path 24 to that of path 22, and, when the plane of polarization is again changed back to perpendicular, the beam will move from path 22 back to path 24. In this manner, the beam will be switched between the two paths. These directions are determined by the apex angle of the prism, the two indices of refraction of the birefringent material, and that of the surrounding medium.

Referring now to FIG. 2 there is shown a conventionally energized source of monochromatic collimated light, such as a laser 26 or other collimated point source of light, which sends a beam 28 through a polarization filter 30, designed for passing light rays that are plane polarized at a 45° angle. The plane polarized rays are then passed through a polarization switch 32 which, when energized, will rotate the plane of polarization by 90°. A battery 34 and switch 36 are shown to illustrate a means for energizing the polarization switch 32. One such form of polarization switch is an electro-optical retarder, such as a Kerr cell. Such a cell may consist of a container filled with nitrobenzene or comparable substance. The prism 10 of birefrigent material is positioned to receive a light beam 28' from the polarization switch 32. As described above in connection with FIG. 1, the prism 10 has two indices of refraction, one for light having a plane of polarization that is parallel to the optic axis 12 and another for light having a plane of polarization that is perpendicular to the optic axis 12. The prism is preferably made of calcite, because it exhibits a relatively large difference between the two indices of refraction to thereby provide the greatest angle possible between the two directions of deflection. Utilization means such as a pair of photocells 38 and 40 are positioned in such manner that the light beam from the prism 10 will be projected on one or the other, depending upon the angle of plane polarization of the incoming beam to the prism.

In operation, as voltage is applied to the polarization switch 32, the plane of polarization of the light that is plane polarized parallel to the optic axis 12 of the prism 10 is rotated 90° by the switch to a plane perpendicular to the optic axis 12. The prism 10, which is between the switch 32 and the photocells 38 and 40, and which has a different index of refraction for parallel (to the optic axis) polarized light than for perpendicularly (to the optic axis) polarized light, deflects the projected beam from the photocell 38 to the other photocell 40. In the absence of the application of a voltage to switch 32, the plane of polarization remains unchanged (parallel to the optic axis) and the light beam remains projected onto photocell 38. It should be noted that there is no mid position between photocells 38 and 40 upon which the beam may be incident, since switch 32 is either sufficiently energized to rotate the angle of polarization by 90° and thus change the angle of refraction of the signal beam or it is not sufficiently energized and the signal beam angle is unchanged. There is no third angle to which the beam may be directed.

FIG. 3 illustrates the construction of a beam deflector unit 42 including a polarization switch, such as the switch 32 of FIG. 2, and the prism 10 incorporated in a single unit. The beam deflector unit 42 may include a light transparent container 44 filled with suitable Kerr cell liquid 46 such as nitrobenzene. A pair of Kerr cell electrodes or parallel plates 48 are immersed in the liquid 46. A pair of leads 50 attached to the plates 48 are brought out through the sides of the container 44 for connection to a suitable voltage source for energizing the Kerr cell plates 48. The plates 48 immersed in the liquid 46 constitute a conventional Kerr cell polarization switch.

The remaining part of the deflector unit 42 is constituted by the prism 10 immersed in the liquid 46 adjacent to the ends of the Kerr cell plates 48. The prism is oriented with its apex 16 perpendicular to the Kerr cell plates 48, and its optic axis 12 at a 45° angle to the plates 48.

By immersing the prism 10 in the Kerr cell liquid 46, two desirable features are achieved. First, the reflection losses at the prism faces become negligibly small. Secondly, the two deflection directions at the deflector unit subtend almost the same angle at the system axis of the unit. This keeps the system axis of the entire light beam deflector straight and eliminates the need for extra isotropic prisms and special liquids used in the prior art.

A plane polarized light beam 14 introduced to the deflector unit 42 with a plane of polarization at 45° to the Kerr cell plates 48 and parallel to the optic axis 12, as indicated by the arrow 18, will enter the prism 10 with its polarization unchanged if the plates 48 are not energized. The light beam 14 will be deflected by the prism 10 by one deflection angle in the manner already described.

However, if the light beam 14 passes through the Kerr cell while the plates 48 are energized with a suitable voltage, the light beam will have its plane of polarization shifted 90° in a direction indicated by the arrow 20. The plane of polarization of the light beam entering the prism 10 will be perpendicular to the optic axis 12 and the prism 10 will deflect the beam by a different angle from the first deflection. Both deflections of the light beam will be perpendicular to the apex 16 of the prism 10 and parallel to the Kerr cell plates 48.

FIGS. 4 and 5 illustrate how the beam may be switched through a plurality of positions in one dimension in response to a switch actuator 52 which selectively energizes a plurality of switches. A light transparent container 54 holds a Kerr cell liquid 56. Immersed in the liquid 56 are a first pair of closely spaced Kerr cell plates 57 forming a first Kerr cell 58 and a first birefringent prism 60. The first Kerr cell 58 receives a light beam 62 from a laser 64 that is plane polarized by a polarizer 66 in a direction parallel to the optic axis of the first prism 60.

The index of refraction of the liquid 56 is approximately midway between the two indices of refraction of the birefringent prism 60. For example, with a calcite prism having indices of refraction of 1.658 and 1.486 for monochromatic light that is polarized parallel and perpendicular to the optic axis of the prism repectively, nitrobenzene having an index of refraction of 1.553 may be used. In this manner the beam leaving the prism 60 may be deflected upwardly along path 68a or downwardly along path 68b in a symmetrical manner depending upon the angle of the plane of polarization of the light beam 62 due to the energization state of the Kerr cell 58. Thus, if Kerr cell 58 is not energized the beam may be deflected along path 68a, for example, and if Kerr cell 58 is energized the beam may be deflected along path 68b. The apex angle of prism 60 between its first and second refracting surfaces is identified as angle θ, which directly related to the angle α between the two beam paths 68a and 68b.

The number of directions in which the beam may be deflected depends upon the number of switching units. The illustration in FIG. 4 uses two switches to deflect the beam in four directions to illustrate the principles involved, although it is to be understood that a greater number of combinations are operable in accordance with these principles.

A second birefringent prism 70 with its associated Kerr cell 72 is positioned within the liquid 56 in the beam paths 68a and 68b so that the beam may be deflected upwardly as well as downwardly in a symmetrical manner. The spacing between the plates 73 or the second Kerr cell 72 is substantially the same as the spacing between the plates 57 or the first Kerr cell 58, as illustrated in FIG. 5. The apex angle of the prism 70 is preferably approximately 2θ, i.e., double that of the first prism 60 in order that the beam entering along path 68a may be deflected upwardly by angle α along path 68c or downwardly by angle α along path 68b for a total difference in deflection of 2α. Similarly, a beam entering the prism 70 along path 68b will be deflected by the prism upwardly by angle α along path 68e or downwardly through angle α along path 68f. The angle α of deflection is more critical than the prism angle 2θ, which is accurate only within certain limits and thus may have to be varied somewhat to obtain the desired deflection.

All four beam paths may intersect a converging lens 73 which is adapted to focus the collimated light beam along these paths to focal points 74, 76, 78, and 80 on utilization means 82 located at the focal plane of lens 72. The position to which the beam is focused is determined by the angle of incidence of the light beam on the lens. Since the angles of incidence of the beam when on paths 68d, 68e, and 68f differ from that of the beam when on paths 68c by α 2α, and 3α, respectively, the points 74, 76, 78 and 80 are uniformly spaced apart. The utilization means 82 may be a photosensitive film or a mosaic of photosensitive semiconductors or other material, which may be scaned to retrieve the stored information.

From FIG. 4 it is seen that there are no light beam paths intersecting lens 73 that are parallel with each other. If the prism angle of prism 70 were the same as the prism angle of prism 60, this would not be the case. Here, however, every different combination of energization states of the switches will cause the angle of incidence of the beam onto the lens to be different, so that the beam will intersect the utilization means 82 at different positions. Thus, there can be no possible redundancy or ambiguity in the switching code used in the positioning of the light beam.

Twenty of these Kerr cell and prism combinations or stages in series will permit the initial beam to be selectively directed along a million separate paths. The number of possible paths is equal to $2^N$ where N is the number of Kerr cell and prism combinations used.

It can be seen that in a one dimensional scanning system in which the optical axis of each prism is oriented at a 45° angle to the apex and the plates of the Kerr cells are perpendicular to the apex, the scanning light beam will trace a path that is perpendicular to the apex and hence parallel to the Kerr cell plates. Accordingly, the Kerr cell plates of the entire series can have uniform close spacing without interfering with the scanning light beam. Because of the closeness of the plate spacing, a minimum amplitude of exciting voltage is required to shift the polarization of the light, which is especially advantageous in a system where a large number of deflector units is required.

A two dimensional scan may be realized by adding to the stages of the first dimension a group of stages in which the prisms are oriented at a 90° angle relative to the prisms of the first group. However, since the beam will undergo deflections in two dimensions through the stages of the second group, the Kerr cell plates therein must have increasingly wider spacings to accommodate the beam paths. Thus, uniform close plate spacing cannot be used in the second group of stages. Nevertheless, the total plate spacing required for this case of two dimensional scanning is still considerably less in this case where the optic axis of each prism is at 45° to the prism apex in contrast to the prior art where the optic axis is parallel or perpendicular to the prism apex.

The embodiments of the invention in which an exclusive property or privilege are defined as follows:

1. A light beam deflector, comprising:
   a birefringent prism having an apex defined by the intersection of two contiguous faces thereof and an optic axis inclined 45° said apex of said prism;
   light source means for producing a beam of light polarized in a first plane inclined 45° to said prism apex and intercepting one of said faces of said prism along a longitudinal axis perpendicular to said optic axis;
   and polarization switch means between said light source means and said birefringent prism for selectively changing the plane of polarization of said light beam between said first plane and a second plane perpendicular thereto;
   said polarization switch means including a pair of parallel electrode plates spaced equidistantly from said longitudinal axis and lying in planes perpendicular to said apex.

2. The invention according to claim 1, wherein said optic axis lies in the plane of said one prism face.

3. The invention according to claim 1, wherein said polarization switch means comprises Kerr cell means having its electrode plates lying in parallel planes perpendicular to said prism apex.

4. The invention according to claim 3, wherein said electrode plates and said birefringent prism are immersed in a Kerr cell liquid enclosed within a common container.

5. A light beam deflector, comprising:
   a container enclosing a Kerr cell provided with a pair of parallel electrode plates spaced apart equidistantly from a central axis and immersed in a Kerr cell liquid;
   a birefringent prism immersed in said liquid in optical series with said Kerr cell and having an apex defined by the intersection of two contiguous faces thereof, with one of said faces intercepting said central axis;
   said birefringent prism having an optic axis perpendicular to said central axis and inclined at 45° to said apex of said prism; and
   said birefringent prism having a first index of refraction for light polarized in a first plane parallel to said optic axis and a second index of refraction for light polarized in a second plane perpendicular to said optic axis.

6. The invention according to claim 5, wherein said optic axis lies in the plane of said prism face.

7. The invention according to claim 5, wherein said electrode plates extend perpendicular to said prism apex.

8. A light beam deflector comprising a plurality of polarization switches and a plurality of birefringent prisms arranged in alternate array and in optical series along a central axis;
   each polarization switch including a pair of parallel electrode plates spaced equidistantly from said central axis;
   each prism having an apex defined by the intersection of two contiguous faces thereof and an optic axis perpendicular to said central axis and inclined 45° to said apex of said prism;
   said prisms having successively larger apex angles;
   the electrode plates of each polarization switch lying in planes perpendicular to the apex of an adjacent prism;
   and the spacings between electrode plates of said polarization switches being substantially the same.

9. A light beam deflector comprising a plurality of polarization switches and a plurality of birefringent prisms arranged in alternate array and in optical series along a central axis;
   each polarization switch including a pair of parallel electrode plates spaced equidistantly from said central axis;
   each prism having an apex defined by the intersection of two contiguous faces thereof and an optic axis perpendicular to said central axis and inclined 45° to said apex of said prism;
   said prisms having successively larger apex angles;
   the electrode plates of each polarization switch lying in planes perpendicular to the apex of an adjacent prism;
   the spacings between electrode plates of said polarization switches being substantially the same; and
   light source means for producing a beam of light directed along said central axis towards the first polarization switch and the prism with the smallest apex angle and polarized in a plane inclined 45° to the apex of the prism with the smallest apex angle.

References Cited

Schmidt, "The Problems of Light Beam Deflection at High Frequencies," Optical Processing of Information, edited by Pollack, Koester & Tippett (Cleaver-Hume Press, 1963).

Kulcke et al., "A Fast, Digital-Indexed Light Deflector," IBM J. of Res. & Dev., vol. 8, No. 1, January 1964, pp. 64–67.

Smith, "Electro-Optic Deflection Device," IBM Tech. Disclosure Bull., vol. 6, No. 12, May 1964, pp. 52–53.

Lee et al., "Transmission and Self-Generated Noise Characteristics of Polarization Scanned Digital Optical System," App. Opt., vol. 3, No. 11, November 1964, pp. 1305–1310.

DAVID SCHONBERG, Primary Examiner

PAUL R. MILLER, Assistant Examiner

U.S. Cl. X.R.

350—157, 160